Jan. 15, 1935.    L. L. FOSS    1,988,196
DOUBLE WORM WATER OR STEAM MOTOR
Filed July 14, 1933
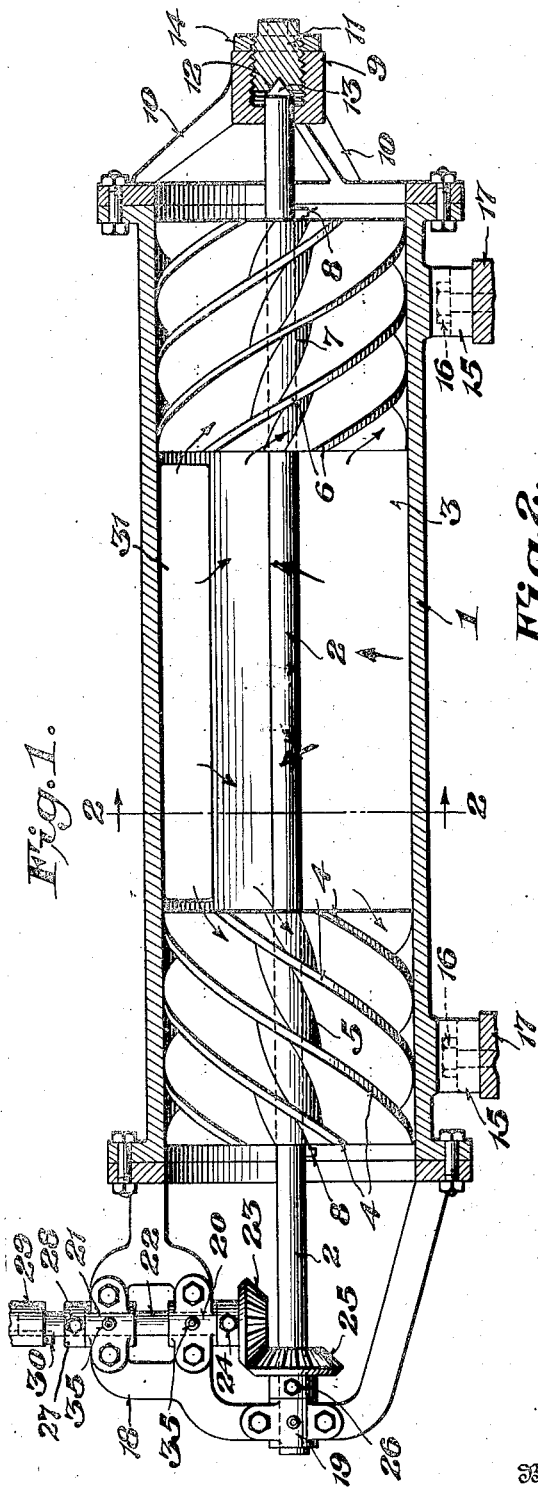
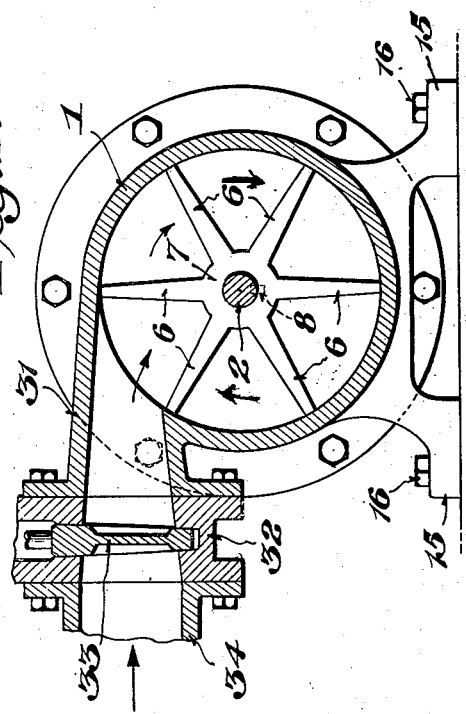
Inventor
*Leland L. Foss,*
By *Lester L. Sargent*
Attorney Patented Jan. 15, 1935

1,988,196

UNITED STATES PATENT OFFICE 1,988,196

DOUBLE WORM WATER OR STEAM MOTOR

Leland L. Foss, Statesboro, Ga.

Application July 14, 1933, Serial No. 680,470

4 Claims. (Cl. 253—149)

The object of my invention is to provide a novel double worm water or steam motor; to provide a novel arrangement of a rotor with left hand worms, and a rotor with right hand worms, the rotors being mounted on the same shaft and positioned at opposite ends of the same casing; to provide a tangential water intake passage disposed tangentially between the rotors, whereby a water or steam whirlpool of high speed will be created before the motive power fluid enters the respective worms arranged on either side of the aforesaid tangential intake passage.

It is a special object of my invention to prevent friction which would cause loss of power, inasmuch as one of the rotors pulls as much one way as the other does in the opposite direction, one of said rotors having right handed spiral threads or worms and the other rotor having left handed spiral threads or worms, the blades being of the same width, length and pitch.

It is also an object of my invention to provide a motor of this type which will produce twice the power of any other water wheel or motor using the same amount of water or steam.

It is also an object of my invention to provide a motor of this type which lays in a horizontal position.

It is also an object of my invention to provide suitable gears on the motor shaft connecting same with a driven shaft.

I attain these and other objects of my invention by the mechanism illustrated in the accompanying drawing, in which—

Figure 1 is a vertical longitudinal section through the casing and bearings of my motor, parts of the apparatus being shown in elevation; and Fig. 2 is a transverse section on line 2—2 of Fig. 1.

Like numerals designate like parts in each of the views.

Referring to the accompanying drawing, I provide a cylindrical casing 1, a motor or drive shaft 2, and spaced rotors 4 and 6 mounted on the respective hubs 5 and 7. The worms of rotor 4 are right hand; and the worms of rotor 6 are left hand. The rotors 4 and 6 are disposed at spaced portions of the casing 1 and arranged on either side of a central tangentially arranged water intake passage 31.

As shown in Fig. 1, each rotor has a series of worms which extend approximately one-half way around the hub. This length of the worm relative to its hub is important, and while some variation is possible the length of the worm should be not less than one third nor more than two thirds the distance around the hub from end to end of each rotor, and the rotors are exactly balanced as to size, weight and pitch of the worms, as shown. The tangential intake passage 31 may be disposed either horizontally or vertically, and opens into the whirlpool chamber 3 tangentially thereof with a reduced mouth as shown to increase pressure of the water entering chamber 3. The whirlpool chamber 3 contains nothing but water or steam and thereby no trash or hard substance entering could cause the worms of the rotors to be broken, as the rotors are disposed in the casing 1 beyond the whirlpool chamber 3 as shown. A difficulty of prior waterwheels is thus avoided.

The motor shaft 2 is provided with a conical end 13 which is mounted in the conical recess 12 of bearing 11 which bearing is kept in place by a suitable nut 14. I provide an end bearing member 9 carried by the spider legs 10 which are suitably affixed to the end of the motor casing 1. I provide suitable legs or supports 15 for the casing 1 which are bolted to the floor or base 17 by bolts 16. The rotor hubs 5 and 7 are secured to the motor shaft 2 by suitable means such as keys 8.

I provide an end frame 18 and bearing 19 for the end of the motor shaft 2, as shown in Fig. 1. I also provide bearings 20 and 21 for the driven shaft 22 which latter shaft carries a gear 23 meshing with the gear 25 on the motor shaft 2.

Gear 25 is affixed to motor shaft 22 by set screws or keys 26, and gear 23 is affixed to shaft 23 by set screws or keys 24. I provide a collar 27 on driven shaft 22 secured to same by set screw 28. I also provide a sleeve coupling 29, mounted on driven shaft 22 and secured by key 30. The function of this coupling 29 is to operatively connect this shaft with another driven shaft.

As shown in Fig. 2, I provide a gateway 32 and gate 33 for opening and closing the conduit 34 which communicates with the water intake passageway 31.

In operation water flows through conduit 34 past gate 33 and through the tangential inflow passage 31 into the whirlpool chamber 3 where it acquires a high rate of speed and flows from said chamber into the spiral passages of the reversely threaded worms 4 and 6 of the respective rotors, as their spiral blades are of the same pitch, same size, and same length, the thrust of one rotor exactly balances the thrust of the other rotor, thereby eliminating friction and increasing the power and speed of the motor. The tangential disposition of passage 31; its reduced mouth, as shown in Fig. 2; and the open whirlpool chamber 2, as shown in Fig. 1, are vital elements of the invention and essential to attain the high speed of water in the whirlpool which increases the speed and power of the rotors. The heavier you load the motor the harder it pulls and the less water it uses, up to the stopping point, at which point it only uses about one-third the amount of water used when the motor is running one-half speed pulling or grinding meal; and the difference between the amount of water used when wheel is running idle and when the motor is stopped is about one-sixth as much as when running idle. The reason for this is the water is circling in the whirlpool in the opposite direction from that which it has to circle to get out. To escape from the whirlpool the water has to follow the worms of the motor, which circle or spiral just the opposite way to that which the water travels in the whirlpool, causing the motor to have more than twice the speed and power that it would have if the water came straight at the motor rotors.

In the steam type of my invention the water may be conveyed away from the motor by pipes to condense the steam back into water. Likewise, in any water wheel where it is found desirable the water may be taken away from the motor in pipes to prevent leaking or wetting the floor on which the motor is mounted. This also applies to the water motor type where the water comes in pipes to the motor and is carried away in pipes. So you could not tell whether the motor was run by water or steam without testing it with the hand to see whether it was hot or cold.

I contemplate using a series of the worms in balanced arrangement, and of approximately the length shown in the drawing and with any pitch of worm desired, it being required that the worms be balanced as to number and pitch and size.

It is also contemplated that I may change the pitch of the blade to any degree that might be desired and to vary the number of worms on each rotor, it however being required that, as shown in Fig. 1, a series of worms be provided on each rotor and that the rotors be of the same size, weight and pitch of worms.

It is also contemplated that the machine may be built of any suitable size according to the pressure required either by steam or water.

The worms may be either bolted to, or machined out or welded and integral with the hubs of the rotors.

What I claim is:

1. In a double worm water or steam motor, the combination of a cylindrical casing, an inflow water passage disposed along the central portion of and opening tangentially into said casing, a shaft extending longitudinally of the casing, spaced and balanced rotors mounted on said shaft and positioned to receive water from an interposed whirlpool chamber, the aforesaid interposed whirlpool chamber, each of said rotors having a series of reversely disposed worms of like pitch and length, said worms extending not less than one-third nor more than two-thirds of the distance around the hub of the rotors.

2. In a double worm water motor, the combination of a casing, an inflow water passage opening tangentially into said casing at an intermediate portion thereof, said passage being reduced at its mouth, a whirlpool chamber into which said inflow water passage opens to cause the water to whirl in the chamber in the opposite direction from the direction which it has to follow in passing through the rotors of the motor, balanced rotors on either side of the whirlpool chamber and into which the whirling body of water is delivered under high pressure, each of said rotors having a series of worms, said worms extending approximately one-half the distance around the hub of the rotor, substantially as shown.

3. In combination with the apparatus defined in claim 2, a common shaft on which the balanced rotors are mounted, gearing operatively connected to the shaft, and a shaft and pulley operatively connected to said gearing.

4. In a double worm water or steam motor, the combination of a cylindrical casing open at both ends and having frame members extending out from the open ends of the casing, bearings in said frame members spaced substantially from the ends of the casing, a drive shaft mounted in said bearings, spaced and balanced rotors mounted on said shaft, said rotors having reversely disposed worms extending only part way around the hub of the motor, an inflow water passage opening tangentially into the casing and reduced at its mouth and being of a width approximately twice the length of either of the rotors to increase the pressure of the water and the power of the motor, and a whirlpool chamber between the rotors and into which the inflow passage opens tangentially to cause a whirling motion of the water before entering the worms of the motor and escaping in a direction reverse to its whirling motion whereby the heavier the load on the rotors the less water it uses up to the point of stopping the rotors.

LELAND L. FOSS.